(12) United States Patent
Hong

(10) Patent No.: US 7,079,166 B1
(45) Date of Patent: Jul. 18, 2006

(54) GRAPHICAL USER INTERFACE WITH ENHANCED OPERATIONS WHEN CHANGING DISPLAY SCREEN

(75) Inventor: Jerry Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/478,984

(22) Filed: Jan. 7, 2000

(51) Int. Cl.
*G09G 5/00* (2006.01)

(52) U.S. Cl. .................. 345/777; 345/810; 345/823; 345/860

(58) Field of Classification Search ............. 345/734, 345/736, 737–740, 775, 778, 781, 810, 825–828, 345/853, 767, 802, 823, 860, 861, 804, 805, 345/858, 769, 776, 777, 746, 745, 744, 747; 358/1.11, 1.13
See application file for complete search history.

(56) References Cited

U.S. PATENT DOCUMENTS

| | | | | |
|---|---|---|---|---|
| 5,226,117 A | * | 7/1993 | Miklos | 345/853 |
| 5,675,718 A | * | 10/1997 | Miller | 358/1.13 |
| 5,790,119 A | * | 8/1998 | Sklut et al. | 345/772 |
| 5,982,367 A | * | 11/1999 | Alimpich et al. | 345/810 |
| 5,986,653 A | * | 11/1999 | Phathayakorn et al. | 345/835 |
| 6,078,399 A | * | 6/2000 | Kadota | 358/1.11 |
| 6,115,044 A | * | 9/2000 | Alimpich et al. | 345/855 |
| 6,148,346 A | * | 11/2000 | Hanson | 709/321 |
| 6,295,136 B1 | * | 9/2001 | Ono et al. | 358/1.15 |
| 6,310,634 B1 | * | 10/2001 | Bodnar et al. | 345/854 |
| 6,314,570 B1 | * | 11/2001 | Tanigawa et al. | 725/40 |
| 6,344,859 B1 | * | 2/2002 | Alimpich et al. | 345/762 |
| 6,404,443 B1 | * | 6/2002 | Westerman | 345/776 |
| 6,437,875 B1 | * | 8/2002 | Unno | 358/1.16 |
| 6,448,985 B1 | * | 9/2002 | McNally | 345/784 |
| 6,489,971 B1 | * | 12/2002 | Miller et al. | 345/763 |
| 6,496,208 B1 | * | 12/2002 | Bernhardt et al. | 345/853 |
| 6,502,094 B1 | * | 12/2002 | Gvily et al. | 707/5 |
| 6,615,346 B1 | * | 9/2003 | Kawamoto | 713/100 |

\* cited by examiner

*Primary Examiner*—Ba Huynh
*Assistant Examiner*—Nhon (Gary) D Nguyen
(74) *Attorney, Agent, or Firm*—Oblon, Spivak, McClelland, Maier & Neustadt, P.C.

(57) ABSTRACT

A graphical user interface in which a summary list screen displays a plurality of settings for a plurality of respective features, and includes a plurality of tabs corresponding to additional screens and for selecting the corresponding additional screens to be displayed. The corresponding additional screens include the plurality of settings from the summary list screen and additional settings. An indicator, such a mouse controlled by a user, selects one of the plurality of settings in the summary list screen. A controller then changes a display from the summary list screen to one of the additional screens containing the selected one of the plurality of settings, and highlights the selected one of the plurality of settings in the additional screen. Further, the indicator can include a first instruction to change between different of the plurality of settings in the summary list screen and a second instruction to automatically change from the summary list screen to one of the additional screens.

8 Claims, 8 Drawing Sheets

GRAPHICAL USER INTERFACE WITH ENHANCED OPERATIONS WHEN CHANGING DISPLAY SCREEN

BACKGROUND OF THE INVENTION

1. Field of the Invention

The present invention is directed to a graphical user interface which, as one example, may be utilized to control a printer, and which has enhanced features, particularly when making a selection on an initial summary list screen and then switching to a more specific screen.

2. Discussion of the Background

Many personal computers used at the home or office are directly connected to a printer, i.e., a one-to-one connection. For example, FIG. 1 illustrates a conventional set-up of a computer 2 and a printer 6 attached via a cable 4. The printer 6 includes a connection port 7 for attaching the cable 4 to the printer 6. Thus, a user using the computer 2 can select an item or other object to be printed on the printer 6.

When the printer 6 is first installed at the home or office, a printer driver corresponding to the printer 6 is generally supplied on a separate computer readable medium, such as a CD-ROM or floppy disk, and a user must install the printer driver onto the computer 2. The user must also configure the computer 2 to include any available printer options supplied with the printer 6. This is generally accomplished by manually selecting options from a Graphic User Interface (GUI) provided with the printer driver. For example, the GUI may list printer options, such as input trays, output trays, memory available, stapling devices, etc. A base model of the printer generally includes only standard printer options (e.g., one input tray, one output tray, and no extra memory). Thus, the user is required to purchase any desired additional options, such as extra input or output trays.

When the printer driver is loaded onto the computer, the corresponding GUI prompts the user for any additional printer options he or she may have purchased. Then, the user manually selects the additional printer options from the list of options displayed on the GUI. Alternatively, the user may retrieve the available printer options by connecting the printer 6 to a local printer port of the computer 2 and then query a language monitor which enables bidirectional communication between the printer 6 and the computer 2. A language monitor is a software module which uses, for example, page-description language, such as Postscript, PJL, etc., to retrieve the available printer options.

FIG. 2 illustrates a block diagram of a conventional application 10 interfacing the printer 6. The conventional application 10 is hosted on an operating system 14 resident on the computer 2. A user may retrieve the options available with the printer 6 using the application 10, a printer driver 12, and a language monitor 13. The printer driver 12 and language monitor 13 are printer and operating system specific software interfaces. The operating system 14 sends signals in accordance with instructions from the printer driver 12 and language monitor 13 to the local port 18 via a connection 8, thus placing signals corresponding the printer driver 12 and language monitor 13 on the cable 4 connected to a parallel port 9 of the printer 6. That is, via the application 10 and printer driver 12, the printer driver 12 may query the language monitor 13 for the available printer options, and the language monitor 13 retrieves that information from the printer 6 via the local port 18 and cable 4. The printer driver 12 then updates the list of available printer options displayed on the GUI. However, the printer 6 must be connected to the local port of the computer 2 to retrieve the available printer options using the language monitor 13.

Increasingly, a plurality of printers and computers are connected to a network, such as a Local Area Network (LAN). For example, FIG. 3 illustrates a plurality of computers 2 and printers 6 connected to each other via a network 5. The computers 2 and printers 6 illustrated in FIG. 3 are identified by the same reference numeral, however, the network may include many different computers and printers connected together. Also shown is a centralized computer 3, used by a system administrator, for example. The centralized computer 3 generally includes a network manager and/or a printer manager, such as an IBM Network Printer Manager sold under the trademark NPM, or a Hewlett Packard (HP) printer administrator sold under the trademark HP JET ADMIN. The printer manager is used by the system administrator of the network 5 to control, modify, monitor, etc., the plurality of printers 6 connected to the network 5.

As noted above, when controlling the printer 6 a graphical user interface as a part of the printer driver 12 appears on the display of the computer 2. A background graphical user interface includes many features that are categorized into different tabs corresponding to different screens on the graphical user interface. The different tabs may have representations such as "Setup", "Paper", "Print Quality", etc. If a user of the graphical user interface wants to change certain of the settings, the user can "click on", i.e. select with a mouse connected to the computer 2, one of the different tabs to change the screen displayed on the computer 2. The user can then change settings on the new screen corresponding to the tab selected. For example, if an initial display of a graphical user interface includes different tabs of "Setup", "Paper", and "Print Quality", and the user wishes to change the type of paper in the printer, the user can click on the "Paper" tab. When the user clicks on the "Paper" tab a new screen providing different paper settings is displayed on the computer 2. The user can then select or change the different settings displayed on the computer 2 by clicking on the various settings displayed.

However, such a background graphical user interface suffers from a problem in that as computers become more and more complicated, the number of settings and the number of different tabs in the graphical user interface increase significantly. As a result, the graphical user interface itself becomes very complicated and more difficult to use.

Moreover, as a user switches between different screens of the graphical user interface, it may be difficult for the user to immediately locate the settings they wish to change or select.

SUMMARY OF THE INVENTION

Accordingly, one object of the present invention is to provide a novel graphical user interface which includes features which make the graphical user interface easier to use.

A more specific object of the present invention is to provide a novel graphical user interface in which a selection in a summary list screen results in the automatic displaying of an additional screen, and the selection in the summary list screen is highlighted on the additional screen.

The present invention achieves the above and other objects by providing a novel graphical user interface, method of controlling a device through a computer, a computer program product, and a computer system including the graphical user interface.

According to the present invention, a summary list screen displays a plurality of settings for a plurality of respective features, and includes a plurality of tabs corresponding to additional screens and for selecting the corresponding additional screens to be displayed. The corresponding additional screens include the plurality of settings from the summary list screen and additional settings. An indicator, such a mouse controlled by a user, selects one of the plurality of settings in the summary list screen. A controller then changes a display from the summary list screen to one of the additional screens containing the selected one of the plurality of settings, and highlights the selected one of the plurality of settings in the additional screen. Further, the indicator can include a first instruction to change between different of the plurality of settings in the summary list screen and a second instruction to automatically change from the summary list screen to one of the additional screens.

Such a device in the present invention may find particular application where the graphical user interface controls a printer, although the present invention is not limited to that implementation but can be implemented in any graphical user interface.

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

BRIEF DESCRIPTION OF THE PREFERRED EMBODIMENTS

Figure 4:
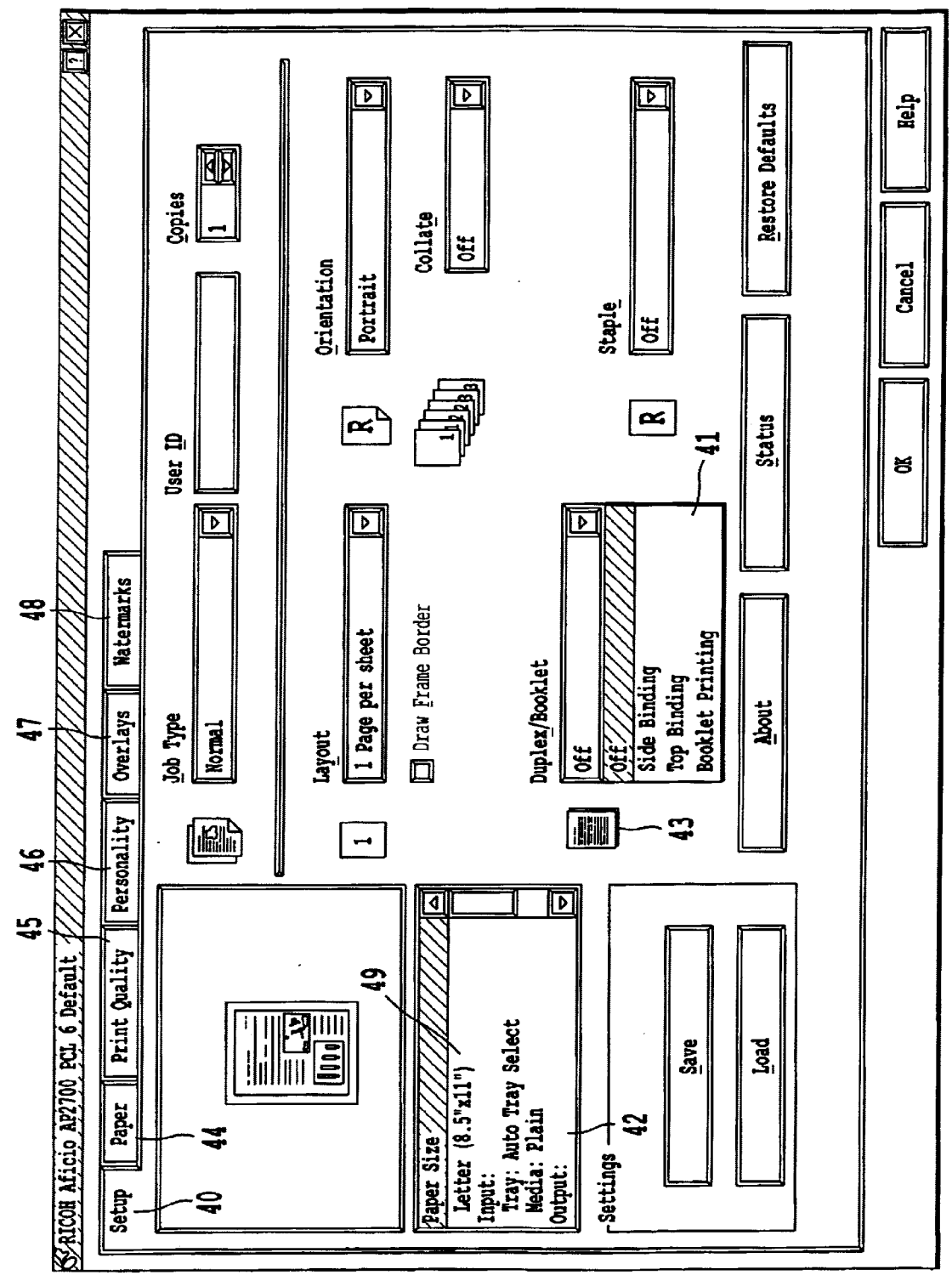
FIG. 4 shows a summary list screen of a graphical user interface of the present invention.

Referring now to the drawings, wherein like reference numerals designate identical or corresponding parts throughout the several views, and more particularly to FIG. 4 thereof, an initial summary list screen 40, corresponding to the "Setup" tab, of a graphical user interface of the present invention is shown.

FIG. 4 shows a summary list screen 40 which has several different controls which a user can select, e.g., "click on" with a mouse. The controls on the graphical user interface summary list screen 40 of FIG. 4 can take any form such as a COMBOBOX, LISTBOX, RADIOLIST, BITMAP, ICON, etc. In the example shown in FIG. 4 a COMBOBOX setting control 41 of "Duplex/Booklet", a LISTBOX setting control 42 directed to the paper size, and an ICON setting control 43 to the left of the Duplex/Booklet COMBOBOX setting control 41, etc. are provided. Other types of controls are shown in FIG. 4 and clearly other controls can be provided.

FIG. 4 also includes plural tabs 44–48 to select different additional screens. That is, if a user clicks on the "Paper" tab 44 a new screen of the graphical user interface with paper controls is displayed. Clicking on any of the other tabs 45–48 causes different screens of the graphical user interface to be displayed.

As shown in FIG. 4, there are many different control settings which a user can click on to select in the "Setup" summary list screen 40. That provides a degree of complexity for a user to use the graphical user interface, which may result in the user becoming confused when switching between the different screens of the graphical user interface. Further, when the user makes a selection in the summary list screen 40, the user may wish to see the screen which has a greater number of selections than in the summary list screen 40. However, in that instance in which the user switches to another screen, the user may have a hard time finding the selection he or she desires if that additional screen has many settings.

One feature of the present invention is to make it easier for the user to switch between different screens in the graphical user interface.

According to such a feature in the present invention, if the user selects one of the control selections in the summary list screen 40 of FIG. 4, the graphical user interface controller, which is a part of the printer driver 12, of the present invention automatically switches to the appropriate detailed additional screen which includes that selected control, and further highlights the selected control so the user can quickly identify where the control is on the additional screen. Such an operation in the present invention is shown in further detail with reference to FIGS. 5(a) and 5(b) and the flowchart of FIG. 6, which shows software steps which can be executed, and which, as an example, can be implemented by programming in C++, as would be apparent to those of ordinary skill in the art.

Figure 5A:
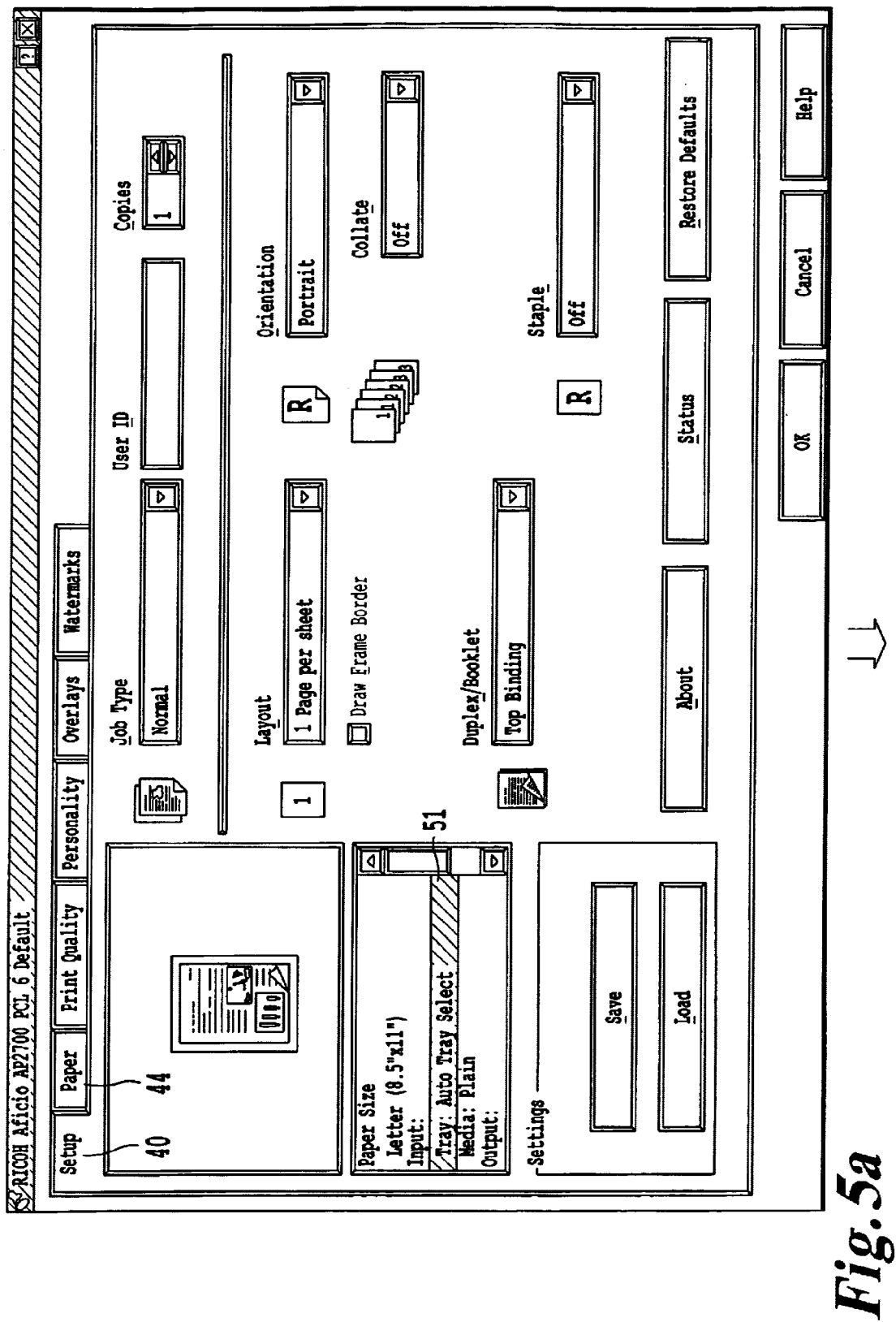
FIGS. 5(a) and 5(b) show the change of a display from a summary list screen to an additional screen in the present invention.
Figure 5B:
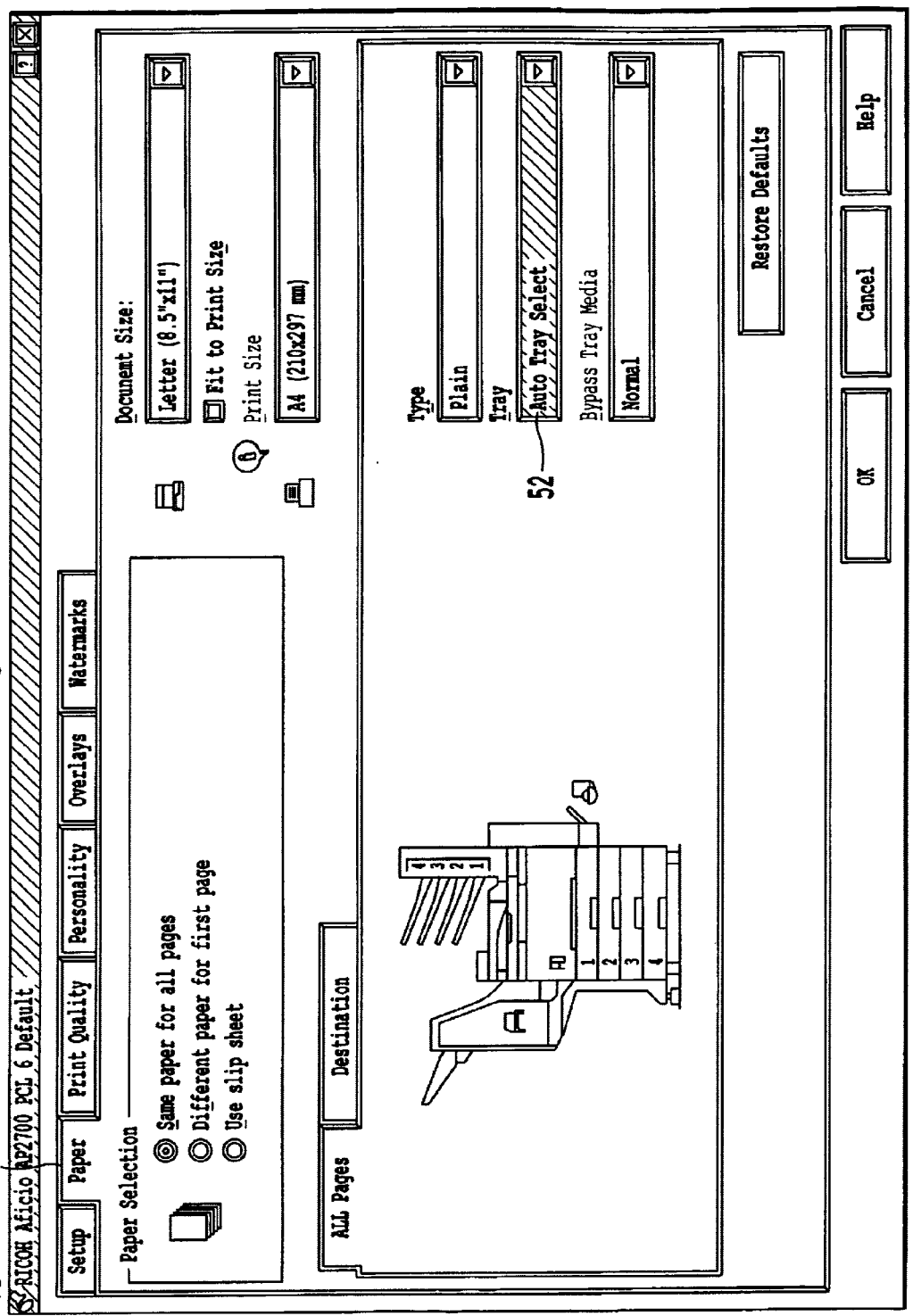
Figure 6:
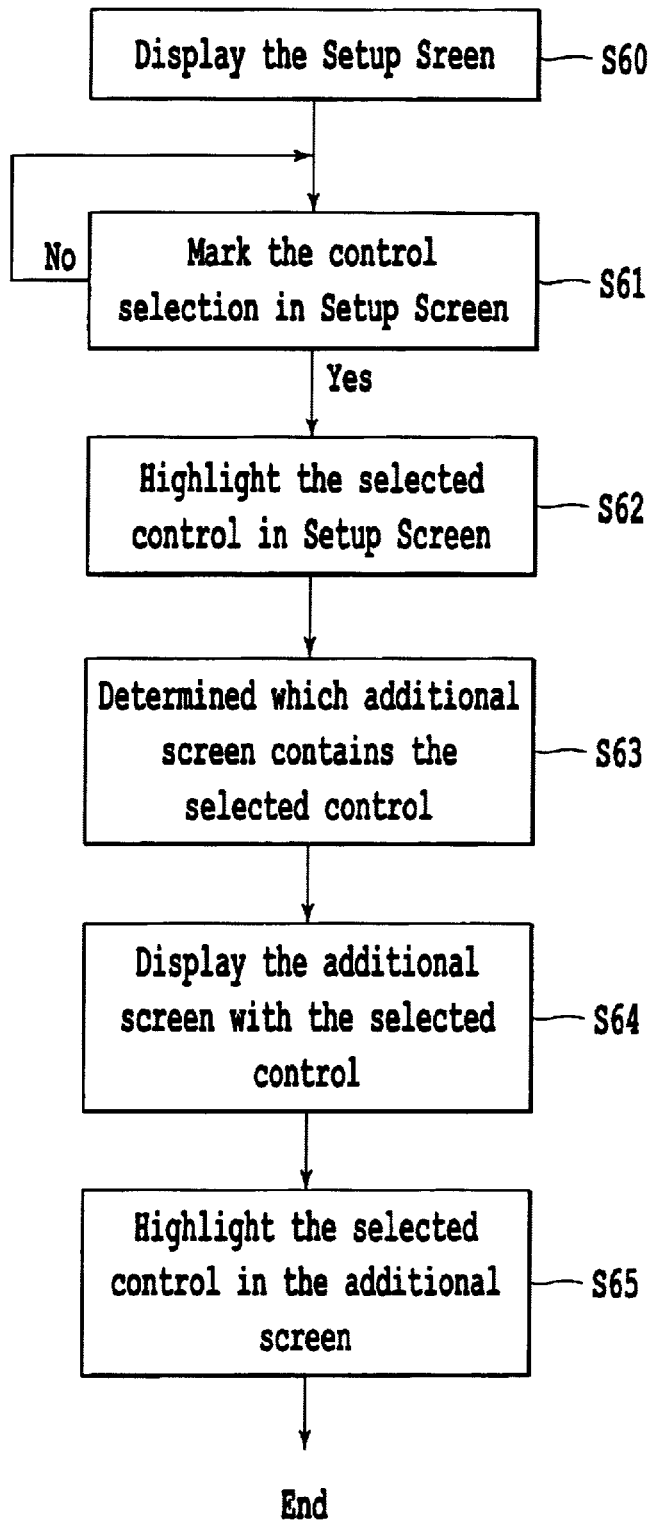
FIG. 6 is a flowchart describing the operations for changing the display from a summary list screen to an additional screen as shown in FIGS. 5(a) and 5(b)

FIG. 5(a) shows the summary list screen 40 of FIG. 4 corresponding to the "Setup" tab, which is initially displayed, see also step S60 in FIG. 6. The user then makes a selection of a control in the summary list screen 40 in step S61, and the selected control is then highlighted in step S62. In the example of the setup summary list screen 40 of FIG. 5(a), the user has made a selection to change the Auto Tray Select control 51. In that instance the user clicks on the Auto Tray Select control 51, which is indicated in FIG. 5(a) by that control 51 being highlighted indicating that the user has clicked on the Auto Tray Select control 51. According to a feature in the present invention, when the user selects the Auto Tray Select control 51, the control system of the present invention determines that the Auto Tray Select control 51 is directed to a paper control, and that the paper controls are further detailed on the screen corresponding to the Paper tab 44. That is, in step S63 the control system determines which additional screen has the selected control from step S61. Then, the system of the present invention automatically changes the screen shown on the display of the computer 2 from the setup summary list screen 40 of FIG. 5(a) to the additional screen having the selected control in step S64, e.g. the Paper tab screen 44 as shown in FIG. 5(b). That is, when the system of the present invention determines that the Auto Tray Select command 51 corresponds to control settings on the Paper tab screen 44, the system automatically changes the display screen from the summary list screen 40 of FIG. 5(*a*) to the screen shown in FIG. 5(*b*) corresponding to the Paper tab 44. Further, the selected control is then highlighted on the displayed additional screen in step S65. In the example being discussed, and as shown in FIG. 5(*b*), the Auto Tray Select control 52 on the Paper tab screen 44 is automatically highlighted when the Paper tab screen 44 is displayed. Such an operation provides the significant benefit that the computer user can immediately see where the controls to change the Auto Tray Select settings are on the additional Paper tab screen 44 as soon as that additional Paper tab screen 44 is displayed. Thus, the user can then move to the Auto Tray Select settings 52 on the additional Paper tab screen 44 and make the desired selection as to the Auto Tray.

Moreover, when the Paper tab screen 44 as shown in FIG. 5(*b*) is displayed, the user is not limited to selecting the Auto Tray Select setting 52, but can make any selection within any setting in the additional Paper tab screen 44, such as shown in FIG. 6 in which the user can make a selection of the document size 61. That is, FIG. 6 shows the same additional Paper tab screen 44 but indicates that a user has selected, i.e., clicked on, a selected paper size of Letter for the document size setting.

As a further feature in the present invention, if the summary list screen 40 shown in FIG. 5(*a*) includes many settings for one control, a user can cycle through the different settings until he or she reaches a desired setting, and the user can then indicate the desired setting, for example by "double clicking" on the desired setting. In such an operation in the present invention, the summary list screen 40 of FIG. 5(*a*) is not replaced by an additional screen until the desired setting is double clicked on. For example, in the summary list screen 40 of FIG. 5(*a*) there may be many different paper sizes which a user can select, such as the paper sizes of Letter, Executive, 5.5 "×8.5", A3, A4, and A5 shown in the LISTBOX 60 in FIG. 6. For example, in FIG. 4 the control 49 may be changed to indicate the various paper sizes. In that instance, the user can single click through each of the different paper sizes in the summary list screen 40 until a desired paper size appears, and the user can then double click on that desired paper size. Only when the user double clicks on the desired paper size does the display change from the summary list screen 40 of FIG. 5(*a*) to a screen detailing the selection of paper sizes, i.e. the Paper tab screen 44.

Figure 7:
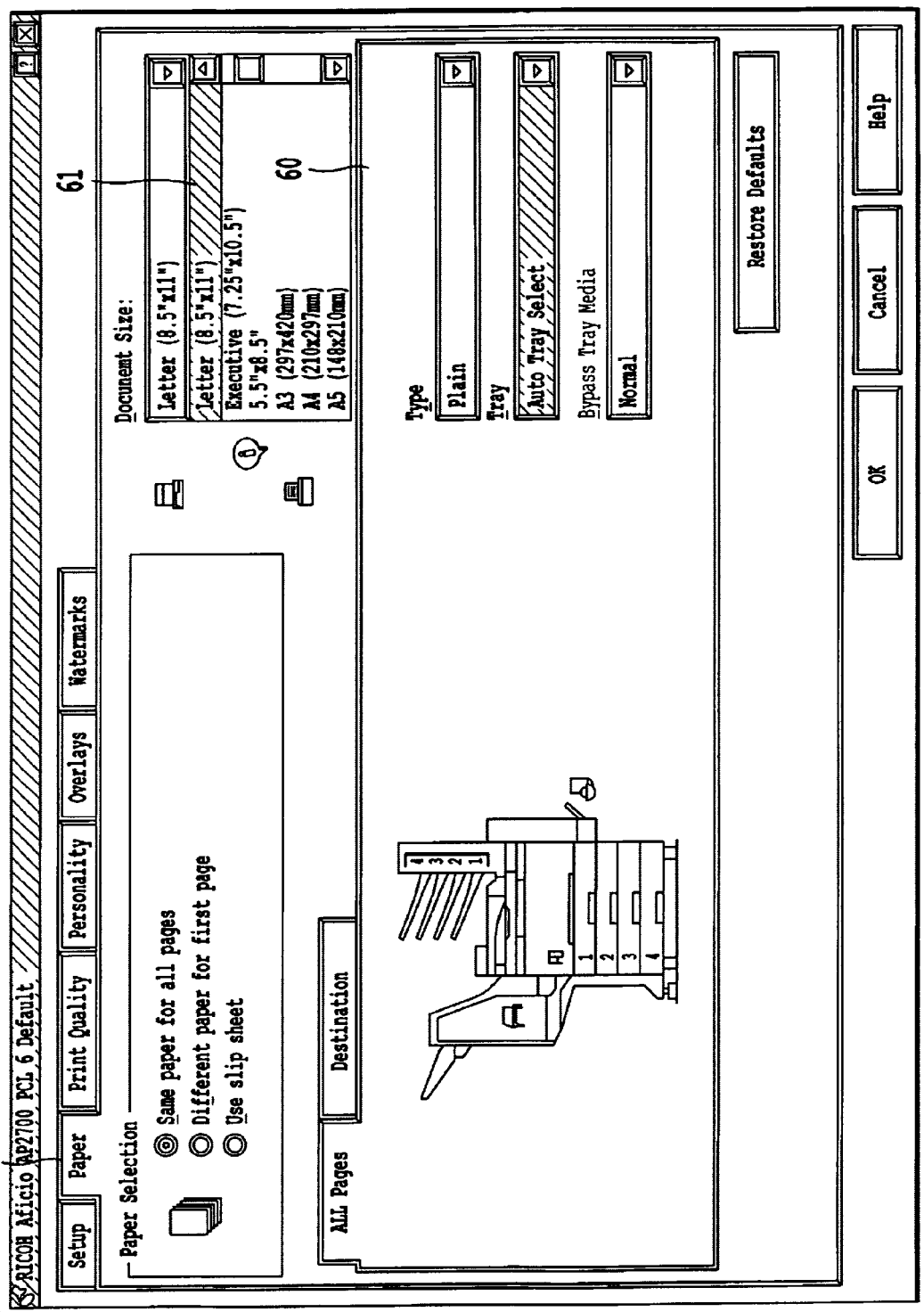
FIG. 7 shows an additional screen of a graphical user interface of the present invention.
Figure 8:
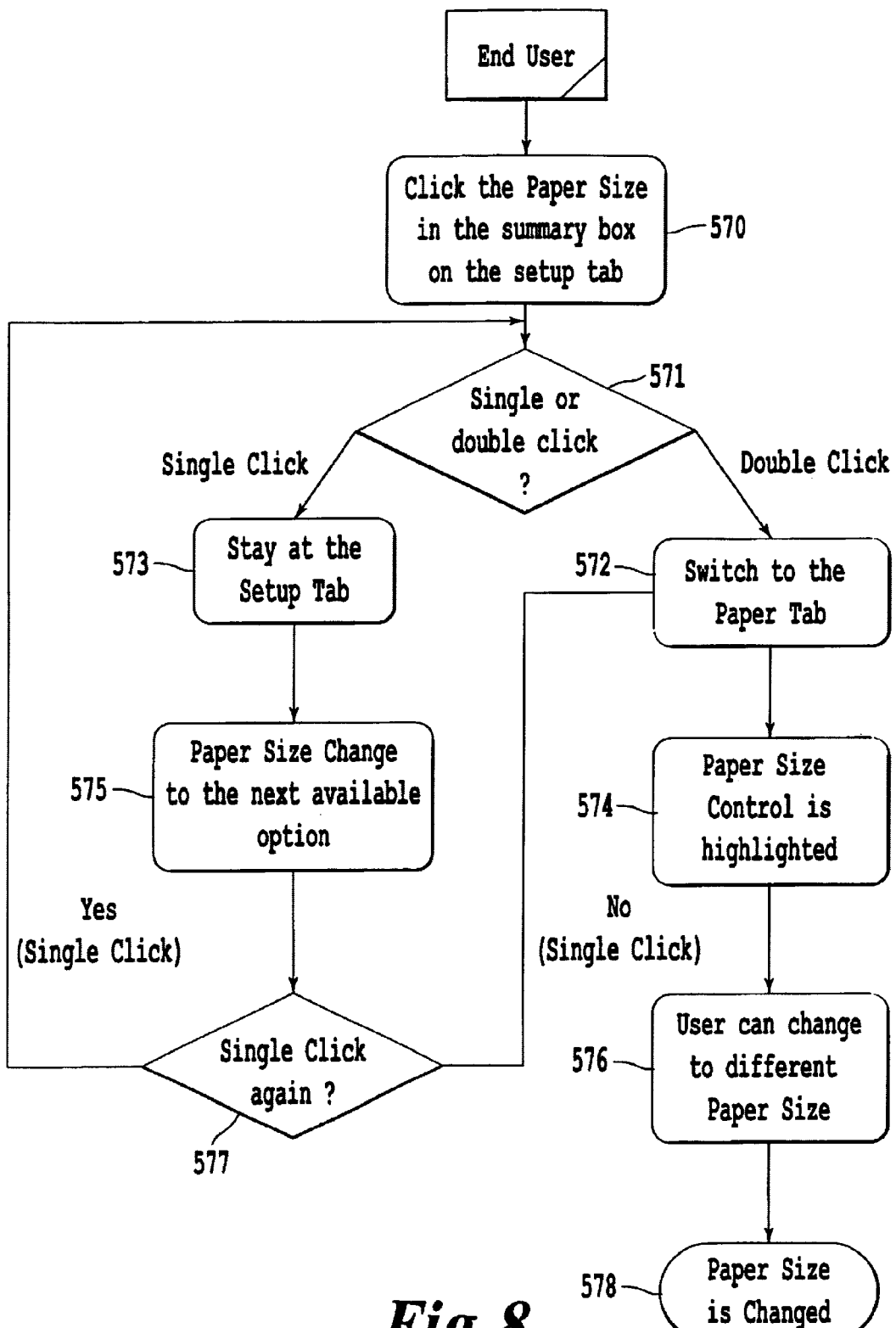
FIG. 8 shows a control operation executed in the present invention.

The control for executing the above-noted control operation is shown in further detail in FIG. 7. FIG. 7 shows the example directed to selecting the paper size Letter in the summary box on the summary list screen 40 in FIG. 1.

Figure 1:
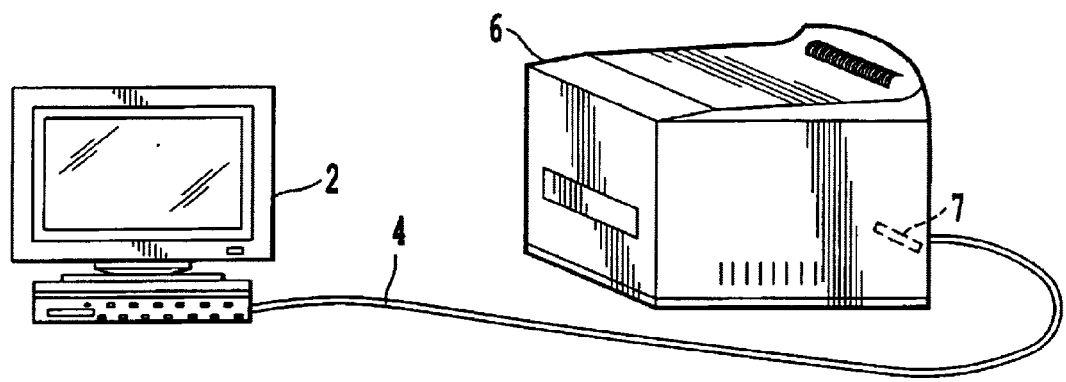
FIG. 1 shows a computer connected to a printer.
Figure 2:
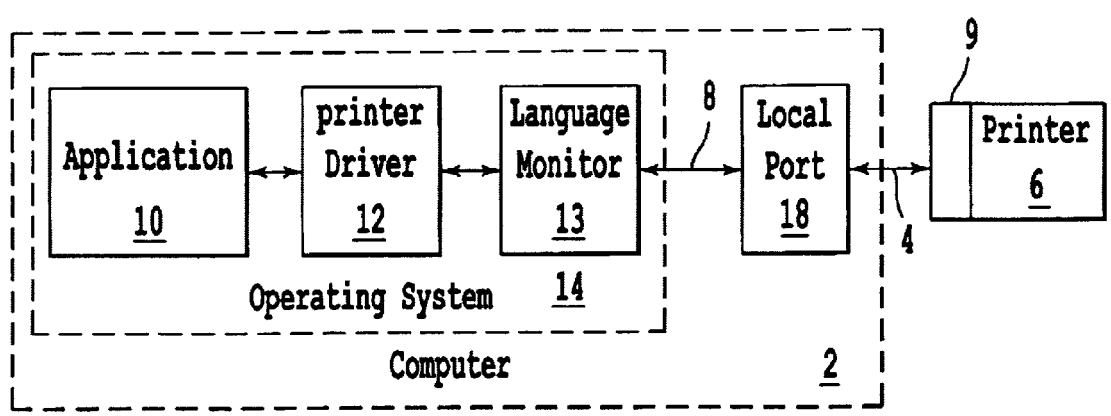
FIG. 2 shows details of the computer connected to the printer of FIG. 1.
Figure 3:
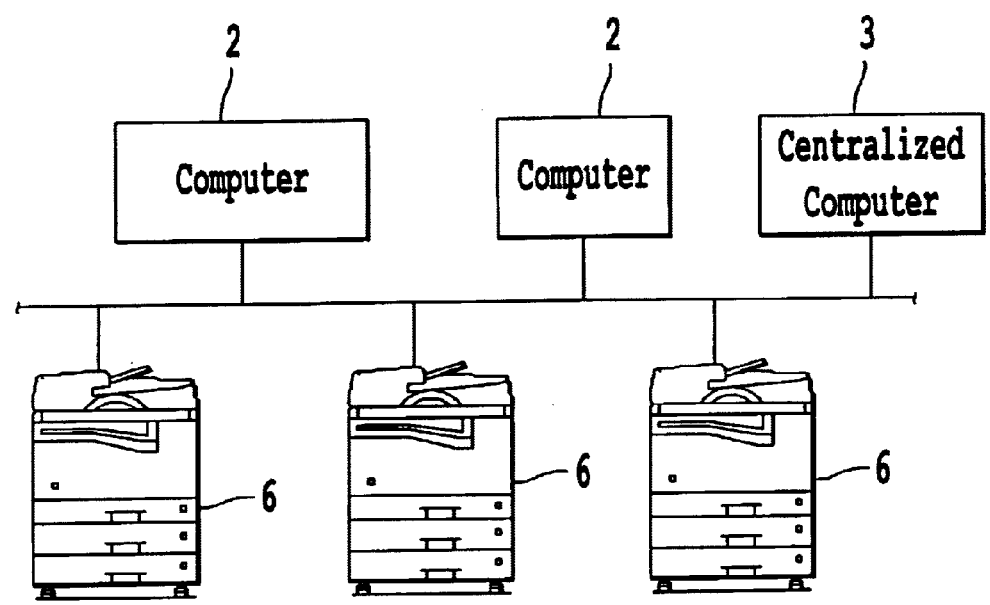
FIG. 3 shows a network of various computers and printers.

As shown in FIG. 7, in an initial step S70 it is determined whether the user is clicking on the paper size in the summary list screen 40 of FIG. 1 corresponding to the Setup tab. The operation then proceeds to step S71 where it is determined whether the user has single or double clicked on the paper size. If the system determines a single click in step S71, the operation then proceeds to step S73. At step S73 the display screen remains the summary list screen 40 corresponding to the Setup tab, and the operation then proceeds to step S75. In step S75 the next available paper size option is displayed. In the example shown in FIG. 5(*a*), the next paper size to be displayed may indicate the "Executive" paper size. The operation then proceeds to step S77 where it is determined whether the user has again single clicked on a paper size. If no in step S77, indicating that the user has double clicked on the selected paper size, the operation then proceeds to step S72. If yes in step S77, indicating that the user has again single clicked on a paper size the operation returns to step S71. The end user can then cycle through the different paper sizes by continuing to single click on the paper sizes and repeating steps S71, S73, S75, and S77.

If the initial or any subsequent determination in step S71 indicates a double click, the operation then proceeds to step S72. In step S72 the screen displayed on the computer 2 changes to the screen corresponding to the Paper tab 44. The operation then proceeds to step S74 in which the paper size control previously double clicked on is highlighted. The operation then proceeds to step S76. In step S76, the user can again change the selected paper size if desired, and the operation then proceeds to step S78 in which the paper size is changed.

With such operations in the present invention, when the user makes a selection in the summary list screen 40 of FIG. 1, an additional screen providing further details for the selection the user made is automatically displayed. Further, when that additional screen is automatically displayed the selection that the user made in the summary list screen is automatically highlighted.

The present invention as discussed above has focused on an initially displayed summary list screen 40 including several tabs as a screen in which an initial selection is made. However, the present invention is clearly applicable to any screen which displays controls which are also displayed on additional screens. That is, a summary list screen as the term is used in the present specification, need not be an initially displayed screen with tabs for additional screens, but may be any screen which has controls that appear on additional screens, and which preferably prompts display of an additional screen.

The operations in the present invention provide the significant benefits of allowing a user to more easily move through the different screens of a graphical user interface. Further, the operations allow the user to immediately see on the additional screens when they are displayed as previous selection, which will make the additional screens easier for the user to utilize.

This invention may be conveniently implemented using a conventional general purpose digital computer or microprocessor programmed according to the teachings of the present specification, as will be apparent to those skilled in the computer art. Appropriate software coding, such as in the computer languages C++ or Visual Basic, can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMS, and magneto-optical disks, ROMs. RAMs, EPROMS, EEPROMS, magnetic or optical cards, or any type of media suitable for storing electronic instructions.

Obviously, numerous additional modifications and variations of the present invention are possible in light of the above teachings. It is therefore to be understood that within the scope of the appended claims, the present invention may be practiced otherwise than as specifically described herein.

What is claimed is:

1. A graphical user interface for controlling a device through a computer, comprising:

a summary list screen configured to display a plurality of settings for a plurality of respective features, and including a plurality of tabs corresponding to additional screens and for selecting the corresponding additional screens to be displayed, the corresponding additional screens also including the plurality of settings;

an indicator configured to select one of the plurality of settings in the summary list screen; and a controller configured to automatically change a display from the summary list screen to one of the additional screens containing the selected one of the plurality of settings when the indicator selects the one of the plurality of settings in the summary list screen, by replacing the summary list screen on the display with the one of the additional screens containing the selected one of the plurality of settings, and to automatically highlight said selected one of the plurality of settings in the additional screen, wherein said indicator includes a first instruction to change between different of the plurality of settings in the summary list screen and a second instruction to automatically change from the summary list screen to the one of the additional screens, and wherein said first instruction is a single click on the one of the plurality of settings and said second instruction is a double click on the one of the plurality of settings.

2. A graphical user interface according to claim 1, wherein the device to be controlled is a printer.

3. A method for controlling a device through a computer, comprising:

displaying a summary list screen of a plurality of settings for a plurality of respective features of the device to be controlled, and including a plurality of tabs corresponding to additional screens and for selecting the corresponding additional screens to be displayed, the corresponding additional screens also including the plurality of settings;

selecting one of the plurality of settings in the summary list screen; and automatically changing a display from the summary list screen to one of the additional screen containing the selected one of the plurality of settings when the indicator selects the one of the plurality of settings in the summary list screen, by replacing the summary list screen on the display with the one of the additional screens containing the selected one of the plurality of settings, and automatically highlighting said selected one of the plurality of settings in the additional screen, wherein in said selecting a first instruction changes between different of the plurality of settings in the summary list screen and a second instruction automatically changes from the summary list screen to the one of the additional screens, wherein said first instruction is a single click on the one of the plurality of settings and said second instruction is a double click on the one of the plurality of settings.

4. A method according to claim 3, wherein the device to be controlled is a printer.

5. A computer program product comprising:

a computer storage medium and a computer program code mechanism embedded in the computer storage medium for controlling a device through a computer, the computer program code mechanism comprising:

a first computer code configured to display a summary list screen which includes a plurality of settings for a plurality of respective features, and including a plurality of tabs corresponding to additional screens and for selecting the corresponding additional screens to be displayed, the corresponding additional screens also including the plurality of settings;

a second computer code configured to select one of the plurality of settings in the summary list screen; and a third computer code configured to automatically change a display from the summary list screen to one of the additional screens containing the selected one of the plurality of settings when the indicator selects the one of the plurality of settings in the summary list screen, by replacing the summary list screen on the display with the one of the additional screens containing the selected one of the plurality of settings, and to automatically highlight said selected one of the plurality of settings in the additional screen, wherein said second computer code includes a first instruction to change between different of the plurality of settings in the summary list screen and a second instruction to automatically change from the summary list screen to the one of the additional screens, wherein said first instruction is a single click on the one of the plurality of settings and said second instruction is a double click on the one of the plurality of settings.

6. A computer program product according to claim 5, wherein the device to be controlled is a printer.

7. A computer system for controlling a device through a computer, comprising:

means for displaying a summary list screen for displaying a plurality of settings for a plurality of respective features, and including a plurality of tabs corresponding to additional screens and for selecting the corresponding additional screens to be displayed, the corresponding additional screens also including the plurality of settings;

means for selecting one of the plurality of settings in the summary list screen; and means for automatically changing a display from the summary list screen to one of the additional screens containing the selected one of the plurality of settings when the indicator selects the one of the plurality of settings in the summary list screen, by replacing the summary list screen on the display with the one of the additional screens containing the selected one of the plurality of settings, and to automatically highlight said selected one of the plurality of settings in the additional screen, wherein said means for selecting includes a first instruction to change between different of the plurality of settings in the summary list screen and a second instruction to automatically change from the summary list screen to the one of the additional screens, wherein said first instruction is a single click on the one of the plurality of settings and said second instruction is a double click on the one of the plurality of settings.

8. A computer system according to claim 7, wherein the device to be controlled is a printer.

* * * * *

UNITED STATES PATENT AND TRADEMARK OFFICE
CERTIFICATE OF CORRECTION

PATENT NO. : 7,079,166 B1 Page 1 of 1
APPLICATION NO. : 09/478984
DATED : July 18, 2006
INVENTOR(S) : Hong It is certified that error appears in the above-identified patent and that said Letters Patent is hereby corrected as shown below:

On the title page, Item (54), and Column 1, the Title is incorrect. Item (54) and Column 1 should read:

-- (54) GRAPHICAL USER INTERFACE WITH
ENHANCED OPERATIONS WHEN
CHANGING DISPLAY SCREENS --

Signed and Sealed this

Twenty-eighth Day of November, 2006

JON W. DUDAS
*Director of the United States Patent and Trademark Office*